United States Patent [19]
Gonsalves et al.

[11] Patent Number: 5,021,736
[45] Date of Patent: Jun. 4, 1991

[54] SPEED/POSITION SENSOR CALIBRATION METHOD WITH ANGULAR ADJUSTMENT OF A MAGNETORESISTIVE ELEMENT

[75] Inventors: Edward M. Gonsalves, Swansea; Stephen B. Offiler; Douglas B. Strott, both of Atleboro; Steven Beringhause, West Roxbury, all of Mass.

[73] Assignee: Texas Instruments Incorporated, Dallas, Tex.

[21] Appl. No.: 409,226

[22] Filed: Sep. 19, 1989

[51] Int. Cl.$^5$ ............ G01R 35/00; G01R 33/06; G01P 3/488; H05K 13/04
[52] U.S. Cl. ............................. 324/202; 29/834; 29/841; 174/52.2; 324/207.21; 324/252; 324/174; 38/32 R
[58] Field of Search ........... 324/202, 207.2, 207.21, 324/207.25, 173, 174, 235, 251, 252; 338/32 R; 307/309; 29/831-834, 841

[56] References Cited

U.S. PATENT DOCUMENTS

| | | | |
|---|---|---|---|
| 3,613,000 | 10/1971 | Weir et al. | 324/207.21 X |
| 4,506,217 | 3/1985 | Rothley et al. | 324/252 X |
| 4,712,064 | 12/1987 | Eckardt et al. | 324/207.21 |
| 4,725,776 | 2/1988 | Onodera et al. | 324/207.21 |
| 4,754,221 | 6/1988 | Ao et al. | 324/207.21 |
| 4,935,698 | 6/1990 | Kawaji et al. | 324/235 X |

FOREIGN PATENT DOCUMENTS 0168381 9/1984 Japan .................. 324/207.21

Primary Examiner—Gerard R. Strecker
Attorney, Agent, or Firm—John A. Haug; James P. McAndrews; Melvin Sharp

[57] ABSTRACT

A transducer arrangement comprising a magnetoresistive transducer including a magnetoresistive element responsive to magnetic flux passing therethrough in a predetermined direction to change its electrical resistance as a function of the intensity of the magnetic flux in the predetermined direction and a magnet to provide said magnetic flux. The transducer can include a permanent magnet having a planar surface with a magnetoresistive element offset from the axis of the magnet and optionally at an angle to the planar surface. The transducer can also include a concave surfaced magnet with the magnetoresistive element at an acute angle to the parallel flux lines emanating from the concave surface. As a further embodiment, the magnetoresistive element can be tilted on the magnet surface in two directions to provide a bias field and calibration. As a third embodiment, a high permeability pole piece can be positioned on the magnet surface between the magnet and the magnetoresistive element to minimize field variation due to nonuniformities in the magnet. There is also provided a module including an aluminum bracket mountable at the fore portion thereof and containing a magnetoresistive transducer circuit at the aft portion thereof, the circuit being coupled to a semiconductor circuit disposed at the center of the bracket. An epoxy resin encases the transducer circuit and semiconductor circuit as well as an optional cable or electrical connector at the fore portion of the bracket.

2 Claims, 3 Drawing Sheets

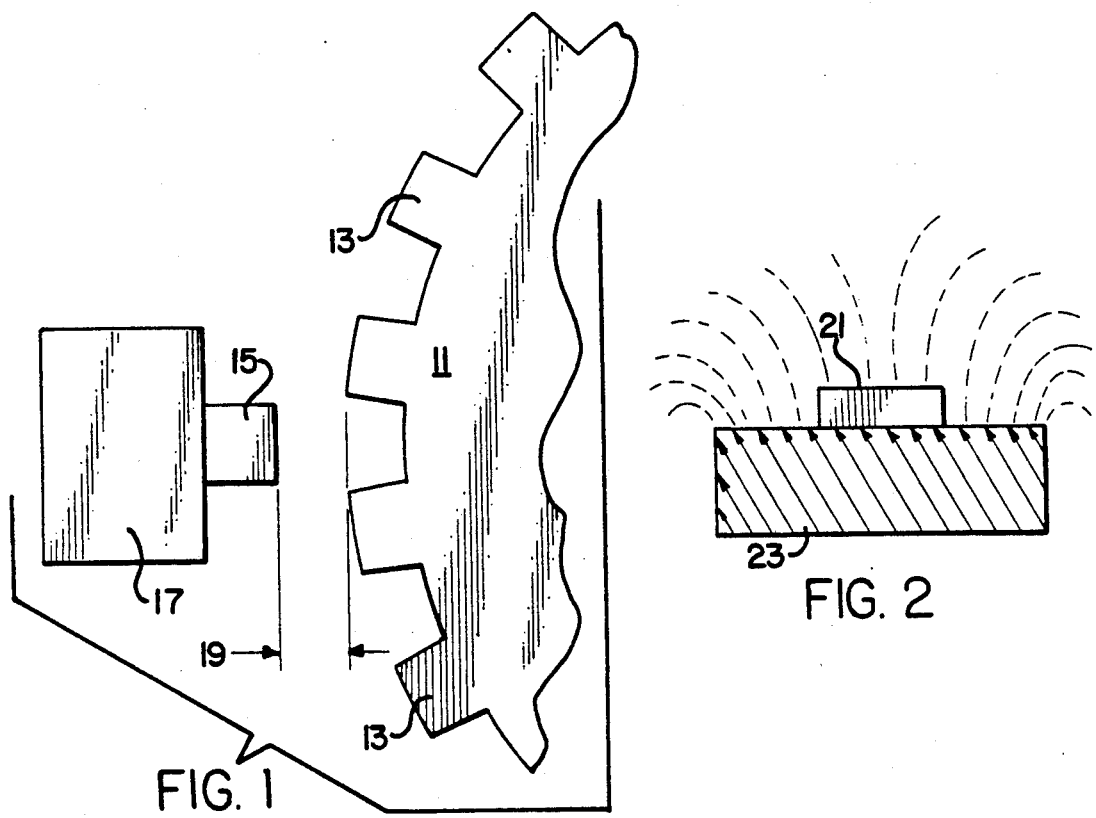
FIG. 1
FIG. 2
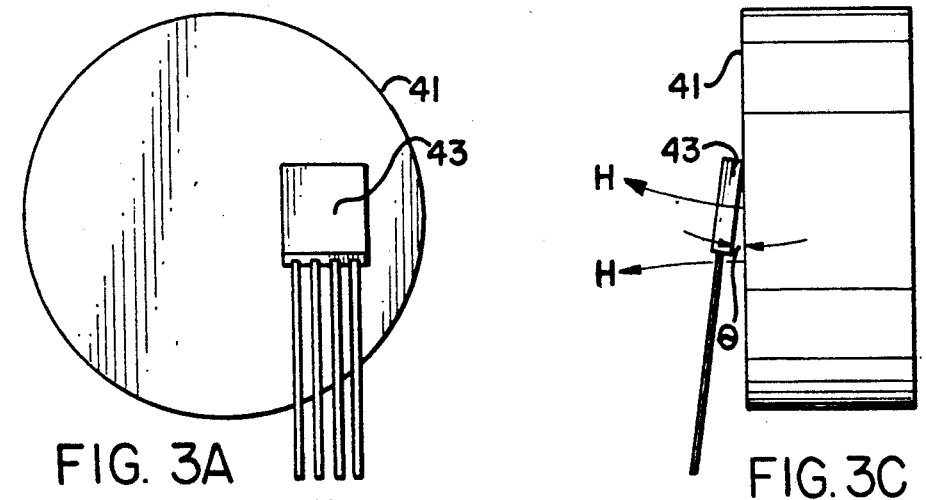
FIG. 3A
FIG. 3C
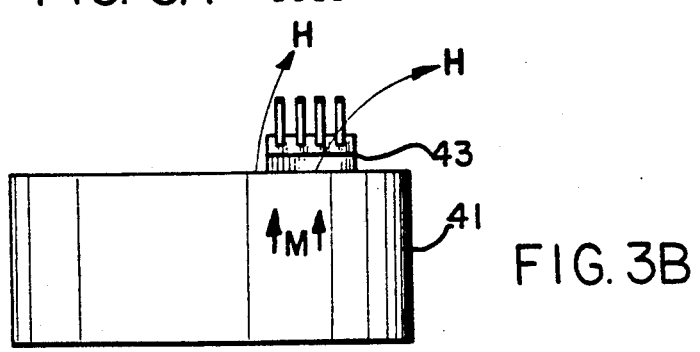
FIG. 3B

SPEED/POSITION SENSOR CALIBRATION METHOD WITH ANGULAR ADJUSTMENT OF A MAGNETORESISTIVE ELEMENT

BACKGROUND OF THE INVENTION

1. Field of the Invention

This invention relates to a system for sensing the position of a ferromagnetic object, such as, for example, a tooth on a moving gearwheel and a magnetoresistive transducer arrangement for determining such position as well as the use of such sensed information to determine the speed and/or position of the magnetic object. This invention is particularly suited to various speed and/or position measurement requirements found on automotive vehicles.

2. Brief Description of the Prior Art

The position and/or velocity of a ferromagnetic object can be magnetically sensed by measurement of the change in a magnetic field caused by the movement of the ferromagnetic object through the magnetic field. The sensor utilized in such measurement arrangements generally comprises a transducer, a conditioner and packaging.

The use of transducers to measure changes in a magnetic field is well known. Such transducers convert some physical phenomenon into an electrical signal from which the measurement is derived. Typically, such transducers have been variable reluctance sensors wherein the movement of a ferromagnetic object in the vicinity of and through the magnetic field of a coil/permanent magnet thereof causes a voltage to be induced in the coil due to the change of the magnetic flux pattern through the coil.

Magnetoresistive transducers are also known in the art and have also been used in the past in conjunction with other circuitry to indicate position and/or measure velocity of a magnetic object, an example of which is set forth in U.S. Pat. No. 4,754,221. There are several known materials which display magnetoresistive properties, the most common such material being permalloy, a well known nickel-iron alloy. Films of these materials are sensitive to magnetic fields along the thin plane of the material rather than through their thickness dimension. Typical prior art in this regard is set forth in the patent of Kuijk No. 4,052,748 and in an article entitled Magnetic Field Sensors Using the Magnetoresistive Effect by U. Dibbern, Sensors and Actuators, 10 (1986) 127-140. Indium antimonide, a semiconductor material, is another of the materials which exhibits magnetoresistive properties, this material, however, being sensitive to magnetic fields through its thickness dimension rather than along the thin plane of the material as in the case of permalloy. The discussion herein will be confined to the permalloy type of magnetoresistive element.

In the formation of magnetoresistive elements from permalloy, the permalloy is normally sputtered as a thin layer or film onto a substrate, for example silicon, the permalloy film residing on the substrate and having a thickness of 20 to 200 nanometers, preferably about 50 nanometers. The permalloy is further processed, either during or after sputtering, to induce a permanent magnetization in the film. The permalloy film is often used in a configuration in which a full or half wheatstone bridge pattern is etched onto the film such that a voltage divider network is created. Resistance changes in the film are thereby converted to a voltage output. Permalloy magnetoresistive transducers respond to changes in the magnetic field vector in the plane of the film and do not respond to magnetic field components normal thereto. This response is represented by a change in the electrical resistance of the permalloy as a function of the angle between the magnetic field vector passing therethrough in the plane thereof and an electric current vector in the same plane.

The prior art systems which use the variable reluctance sensors suffer from the limitations that, at low speeds, the output voltage thereof becomes small and more difficult to use and that the sensor has a strong dependence upon the gap between the target and the face of the sensor.

The transducer response is elicited when an external field component in the plane of the film causes the internal magnetization of the film to rotate. Fields in the plane of the film can be considered to have two orthogonal components, one parallel to the initial magnetization called the bias field and one perpendicular to the initial magnetization called the measurand field. The bias field is required to ensure that the initial direction of magnetization in the film is stable under the influence of external magnetic disturbances. Furthermore, the sensitivity of the transducer to the measurand field is dependent upon the magnitude of the bias field. The bias field should therefore be as uniform and as constant over the entire film surface as possible. The prior art (shown in FIG. 2) uses a permanent magnet with magnetization at an angle to the magnetoresistive surface to provide the bias field. Such a bias field generation suffers from the drawback that the field lines on one side of the axis of the magnet tend to return in a direction in opposition to the desired bias field, resulting in bias field nonuniformity and sensitivity to external influences (such as nearby ferromagnetic objects).

Furthermore, it is desired that the transducer bridge be calibratable upon assembly to compensate for variations in the magnetoresistive element and magnet characteristics. Such calibration should allow the transducer bridge output voltage to be adjusted to a desired level in order to obtain optimum function of the transducer in concert with associated electronic signal conditioning apparatus. The prior art does not recognize this problem in that it neither makes mention of the need for calibration nor the means to accomplish calibration.

SUMMARY OF THE INVENTION

In accordance with the present invention, the above noted problems of the prior art are minimized.

With use of the magnetoresistive transducer in place of the variable reluctance device, the transducer output level is substantially independent of the speed of the target and is less sensitive to the gap between the target and the sensor, thereby allowing the use thereof in applications where a larger gap variation is required.

To measure position or velocity of a magnetic element or target using a magnetoresistive transducer, a permanent magnet is provided which produces a constant magnetic field with a magnetoresistive transducer thereon. The target has greater ability to carry magnetic flux than the surrounding air, so the flux lines are attracted to the target (e.g, a tooth of a gearwheel). This results in a bending of the flux lines toward the tooth. The magnetoresistive device, which comprises an arrangement of preferably permalloy elements which change electrical resistance in response to changes in magnetic fields therethrough, can sense the bending of the field. Such elements can be composed of permalloy or other magnetoresistive materials. These permalloy elements are arranged into a bridge structure, either half or full Wheatstone bridge, such that a voltage divider network is created. Resistance changes in the magnetoresistive elements are converted to a voltage output by the bridge structure.

As a succession of teeth passes the magnet, the flux lines are attracted to and bent by each particular tooth until that tooth passes out of range. At the same time, the following tooth is just approaching the field and the field is then bent in the opposite direction, toward the approaching tooth. The magnetoresistive element is designed such that it provides a polarized output, for example, a positive output when bent by a departing tooth and a negative output when bent by an approaching tooth (the converse can also be true). The output which results for a succession of similar teeth is approximately a sine wave whose pulses can be counted for a speed sensing application.

A single tooth or ferromagnetic anomaly or target is employed to detect the position of a rotating member. As the magnetic target passes the magnet and transducer, the target disturbs or bends the magnetic field passing through the transducer. The transducer senses the change of the magnetic field therethrough caused by the passage of the target through the magnetic field and provides a change in its resistance in accordance with the instantaneous vector intensity of the magnetic field therethrough and in the plane thereof. The transducer element utilized in accordance with a first transducer embodiment includes a permanent magnet and the magnetoresistive element. The magnetoresistive element is disposed on the magnet at an acute angle relative to the most closely adjacent magnet surface thereto such that the field lines emanating from the magnet are essentially normal to the surface from which they emanate and at an angle from the normal through the axis of the magnetoresistive element and result in a net field component in the plane of the magnetoresistive element.

The field component in the plane of the magnetoresistive element can be considered to be composed of two orthogonal components, one in the direction of the bias field and one in the direction of the measurand field. By suitably adjusting the angular orientation of the magnetoresistive element relative to the magnet, the magnitudes of the bias field and measurand field can be precisely tailored.

In a second embodiment of the invention, the magnetoresistive element is offset from the magnet centerline. As is well known, the fields emanating from the surface of the magnet are in the form of a dipole field. Field lines off the centerline are disposed at an angle to the magnet surface and have a component parallel to the plane of the magnet surface. When the magnetoresistive element is suitably offset from the magnet centerline, the field component parallel to the magnetoresistive element is the bias field. The magnetoresistive element is then angularly disposed such that the measurand field can be calibrated by adjusting the angle between the magnetoresistive element and the magnet face.

In a third embodiment of the invention, a ferromagnetic pole piece is inserted between the magnet and the magnetoresistive element to result in increased uniformity of the field throughout the magnetoresistive element.

In a fourth embodiment of the invention, there is provided a packaging for the magnetoresistive transducer circuit which insulates the electronics associated therewith from high temperature environmental sources by using a plastic package therearound which has a low thermal conductivity. It is also necessary to provide a heat sink for the electronics as closely as possible to a relatively cool mounting bracket location which can be at about 135 degrees C. or less. This is accomplished by providing an L-shaped mounting bracket to which is attached a circuit board or flexible printed circuit having integrated circuits and discrete components thereon. The mounting bracket is secured to a location which can be maintained at 135 degrees C. or below. The mounting bracket is formed of very high thermal conductivity material, preferably aluminum, to maintain the temperature of the mounting bracket very close to that of the mounting location on the vehicle. Accordingly, the circuit board and integrated circuits thereon will closely track the temperature of the mounting bracket which will act as a heat sink for the circuit board and components thereon. This will maintain the junctions of the integrated circuit at about 150 to 160 degrees C., this being within their operating temperatures, thereby improving the reliability of the circuit of which they form a part. The magnet with magnetoresistive transducers thereon is affixed to the end portion of the bracket remote from the flange mounting to the vehicle, which end portion is often subjected to temperatures above 150 degrees C. and often as high as 180 degrees C. The entire bracket including electronics, circuit board, magnet and transducer are encased in a plastic which exhibits very good mechanical strength and fluid resistance to fluids encountered in the particular environment. Epoxy resins have been found to exhibit these properties. The bracket can be provided with an electrical connector or a cable at its low temperature end to bring signal wires from the sensor to a remote device. The connector or cable is also encapsulated in the plastic to provide a satisfactory fluid seal to avoid any contaminants or fluids entering therein and degrading the electronics.

BRIEF DESCRIPTION OF THE DRAWINGS

FIG. 1 is a schematic diagram of a measuring arrangement in accordance with the present invention;

FIG. 2 is a schematic diagram of a first magnetoresistive transducer arrangement in accordance with the prior art;

FIGS. 3a, 3b and 3c are schematic diagrams of top, front and side views, respectively, of a first magnetoresistive transducer arrangement in accordance with the present invention;

DESCRIPTION OF THE PREFERRED EMBODIMENTS

Figure 4A:
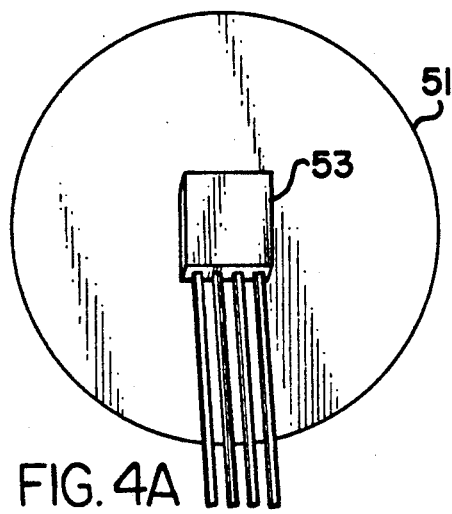
FIGS. 4a, 4b and 4c are schematic diagrams of top, front and side views, respectively, of a second magnetoresistive transducer arrangement in accordance with the present invention.

Referring first to FIG. 1, there is shown a typical arrangement for measuring the position and/or velocity of a ferromagnetic target. The system includes a target 11 which is shown in the form of a rotatable gearwheel having a plurality of teeth 13. A magnetoresistive transducer 15 is disposed on a permanent magnet 17, the transducer being spaced from the gearwheel to form a gap 19 therebetween. The system herein is less sensitive to variations in the gap 19. The biasing means is also less sensitive to the magnetoresistive transducer 15 location on the magnet 17.

The magnetoresistive transducer 15 is a well known device in the form of a bridge, each leg of the bridge containing a magnetoresistive element. One pair of opposing junctions of the bridge is connected across a voltage source and the other pair of opposing junctions provides the bridge output thereacross. The output at one of the output junctions is generally (Ro+delta R)/2Ro and the output at the opposing output junction is generally +(Ro−delta R)/2Ro, where delta R is proportional to the magnetic field across the transducer.

Referring now to FIG. 2, there is shown a prior art embodiment of a transducer including a magnetoresistive transducer 21 positioned on a magnet 23. Fields bent in the plus or minus "Y" direction (into or out of the paper) will produce an output from the magnetoresistive transducer 21 since field components in the "Y" direction have the largest effect on the resistance of the magnetoresistive transducer. The magnetoresistive transducer 21 ignores magnetic field components in the "Z" direction (vertically in the plane of the paper). As can be seen, the permanent magnet 31 is magnetized at an angle to its axis, the "Z" axis.

This prior art approach suffers from large variation in the magnitude of the bias field. This approach also includes no means for calibration. There is no way to set the nominal operating condition of the measured field to an optimum value. It is therefore apparent that greater control over the bias field and means for calibration are required.

Referring now to FIGS. 3a, 3b and 3c, there is shown a first embodiment in accordance with the present invention. As can be seen, there is provided a permanent magnet 41 which is magnetized in a direction parallel to the axis thereof or in a vertical direction in the plane of the paper as shown in FIG. 3b. The magnetoresistive element 43 is disposed in the magnetic field of the magnet 41 and at an angle with respect to the surface of the magnet and is positioned away from the magnet axis whereby a component of the magnetic field H lies along the plane of the magnetoresistive element to provide the required bias thereto. The angle theta is adjusted to obtain calibration of nominal operation condition.

As a further embodiment of the arrangement of FIGS. 3a, 3b and 3c, it should be noted that the surface of the magnet 41 beneath the element 43 can be concave with the amount of the concavity being such as to provide substantially parallel flux lines at all points where they pass through the element 43.

Figure 4C:
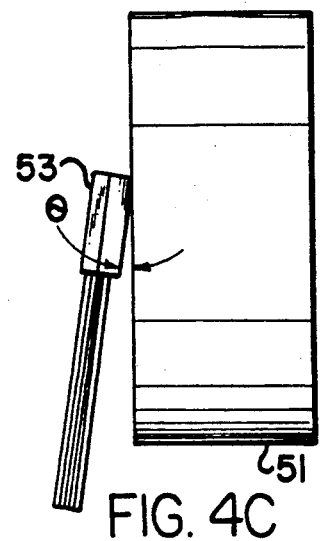
Figure 4B:
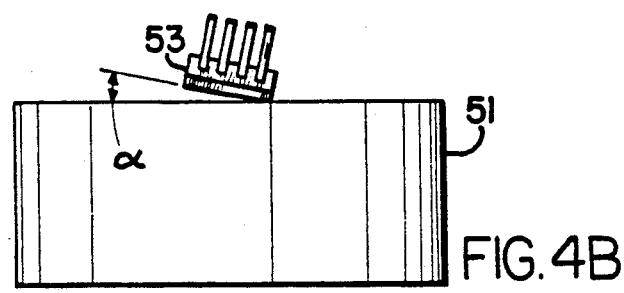

Referring now to FIGS. 4a, 4b and 4c there is shown a second embodiment of a magnetoresistive transducer arrangement in accordance with the present invention. This embodiment includes a permanent magnet 51 magnetized in a direction parallel to the axis thereof which is along the line shown in FIG. 4c. The magnetoresistive element 53 is positioned over the axis of the magnet and is tilted in two directions relative to the surface of the magnet 51 to provide the bias field and calibration. As can be seen in FIG. 4c, the element 53 is tilted at an angle theta with respect to the surface of the magnet 51 to provide calibration and, as can be seen in FIG. 4b, at an angle alpha with respect to the surface of the magnet, as shown to provide bias.

Figure 5B:
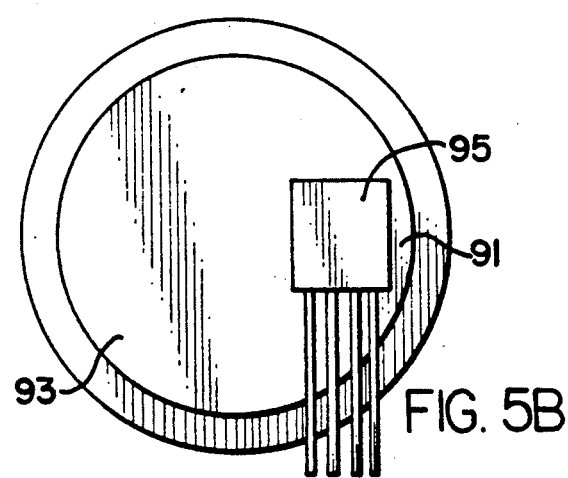
FIGS. 5a and 5b are schematic diagrams of a magnetoresistive transducer having a pole piece thereon.
Figure 5A:
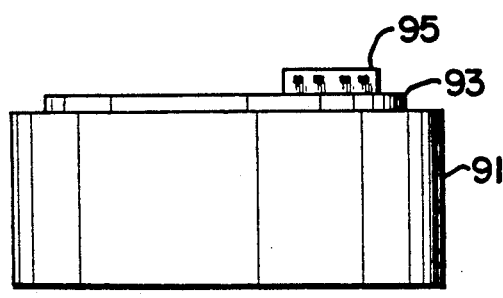

Referring now to FIGS. 5a and 5b, there is shown a system for improving the sensing ability of the sensor. In this embodiment, the problem of variation due to nonuniformities in magnets tends to result in some field dispersion at the magnet pole faces. This problem is minimized by covering the face of the magnet 91 with a high permeability pole piece 93 (e.g., steel). A magnetoresistive element 95 is disposed over the pole piece. The pole piece serves to minimize magnetic field direction dispersion due to magnet nonuniformities. In the design which does not use steel, the variations in direction and magnitude of the field from the magnet cause degradation of the magnetoresistive output signal. Bias field variations and measured field variations are averaged over the area of the magnetoresistive element in such a way that some cancellation may occur, reducing the output level.

The steel or other high permeability pole piece, by having high permeability, causes all the field lines to exit the steel nearly normal to the surface with low dispersion of direction. Thus, variations in field direction are effectively removed. This results in better performance of the sensor, particularly at large target/sensor gaps.

The steel pole piece has a smaller diameter than the magnet diameter in order to minimize leakage fluxes.

Figure 6:
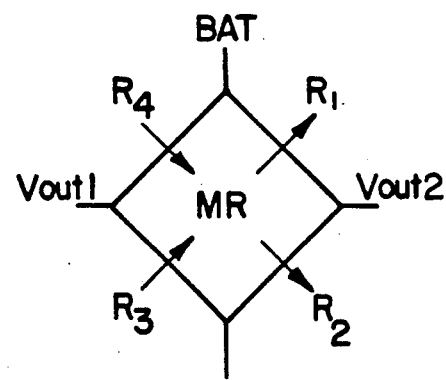
FIG. 6 is a circuit diagram of a typical magnetoresistive transducer circuit of the prior art which can use the transducers described with reference to FIGS. 1 to 5 herein.

A magnetoresistive transducer circuit will typically be in the form of a bridge circuit as shown in FIG. 6. As can be seen, there is provided a bridge circuit wherein each leg includes a magnetoresistive device R1, R2, R3 and R4. A power source, shown in the form of a battery and a reference voltage source is provided across one pair of opposed junctions of the bridge whereas the output is taken across the other pair of opposed junctions of the bridge, these junctions being denoted as Vout1 and Vout2.

When a magnetic field is applied to the magnetoresistive transducer circuit of FIG. 6, the resistor R1 will have a resistance R1=Ro+delta R, the resistor R2 will have a resistance R2=Ro−delta R, the resistor R3 will have a resistance R3=Ro+delta R and the resistor R4 will have a resistance R4=Ro−delta R. Accordingly, the output voltage at terminal Vout1 will be (Ro+delta R)/2Ro and the output voltage at terminal Vout2 will be +(Ro delta R)/Ro. Accordingly, the output of the bridge is proportional to delta R.

In practice, the sensor or magnetoresistive transducer is often located in harsh environments, such as high temperature on the order of about 150 to 180 degrees C. However, the electronic devices used in conjunction with the sensor, such as semiconductor devices, cannot operate reliably at these temperatures. In addition, such electronic devices also generate heat while in operation. It is therefore necessary to insulate the electronics from the high temperature heat source by using a plastic package therearound which has a lower thermal conductivity. It is also necessary to provide a heat sink for the electronics as closely as possible to a cool mounting bracket location which can be at about 135 degrees C. or less.

Figure 7:
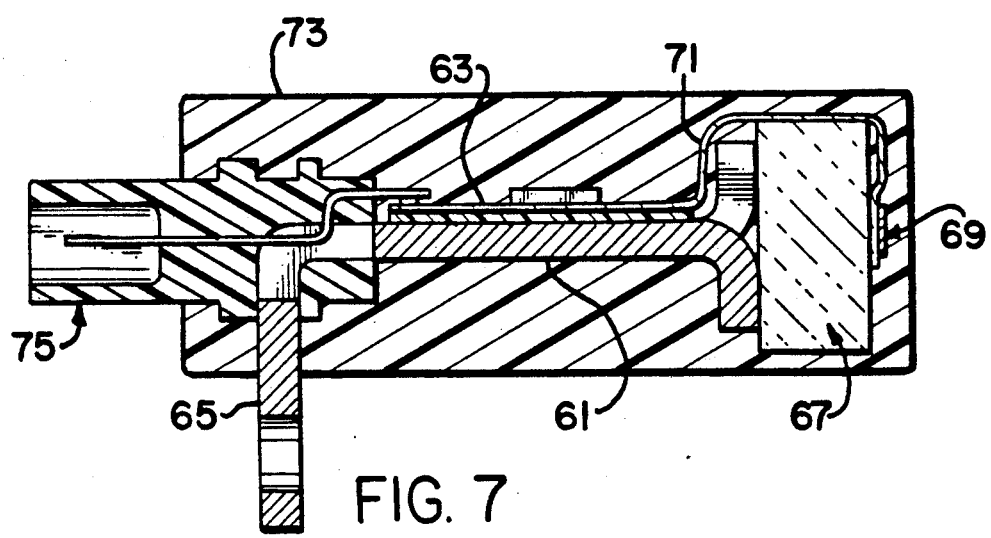
FIG. 7 is a cross sectional view of a packaging for the magnetoresistive transducer circuit of FIG. 6 along with associated circuitry.

This is accomplished, as shown in FIG. 7, by providing an L-shaped mounting bracket 61 to which is attached a circuit board or flex circuit (a flexible printed circuit) 63 having integrated circuits thereon. The mounting bracket is secured to a vehicle by a flange portion 65 thereof to a flange or the like which can be maintained at 135 degrees C. or below. The mounting bracket 61 is formed of very high thermal conductivity material, preferably aluminum, to maintain the temperature of the mounting bracket very close to that of the flange on the vehicle. Accordingly, the circuit board 63 and integrated circuits thereon will closely track the temperature of the mounting bracket which will act as a heat sink for the circuit board and components thereon. This will maintain the junctions of the integrated circuit at about 150 to 160 degrees C., within their operating temperatures, thereby improving the reliability of the circuit of which they form a part. The magnet 67 is the same as the magnet described in the embodiments of FIGS. 1 to 5 and is affixed to the end portion of the bracket 61 remote from the flange 65, which end portion in often subjected to temperatures above 150 degrees C. and often as high as 180 degrees C. A magnetoresistive transducer 69 is affixed to the magnet 67 as described above and wires 71 therefrom are coupled to the electronic circuit on the circuit board 63. The entire bracket including electronics, circuit board, magnet and transducer are encased in a plastic 73 which exhibits very good mechanical strength and resistance to fluids encountered in the particular environment. Epoxy resins have been found to exhibit these properties. The bracket 61 can be provided with an electrical connector or a cable 75 at the flange portion 65 in order to bring the signal wires from the sensor to a remote device. The connector or cable 75 is also encapsulated in the plastic 73 to provide a satisfactory fluid seal to avoid contaminants from entering therein and degrading the electronics.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A method of forming a transducer comprising the steps of:
    (a) providing a magnet having a longitudinal axis and an outer surface lying in a plane perpendicular to the axis and having a magnetic field emanating from said surface, the surface having an x and a y axis;
    (b) providing a thin substantially planar magnetoresistive element means responsive to magnetic flux passing therethrough in a predetermined direction to change its electrical resistance as a function of the intensity of said magnetic flux in said predetermined direction, the element means comprising a substrate, wheatstone bridge means disposed on the substrate including four legs coupled together and having two pairs of opposing junctions, each leg having a magnetoresistive film element, one pair of opposing junctions being connected across a voltage source and the other pair providing a voltage output thereacross;
    (c) positioning said magnetoresistive element means offset from said longitudinal axis by a predetermined amount to establish a predetermined bias field in said element; and
    (d) adjusting the angle the magnetoresistive element means makes with the longitudinal axis to compensate for variations in the magnetoresistive element means, the magnet and their assembly to thereby calibrate the transducer so that the said voltage output is centered on a selected level.

2. A method as set for in claim 1 wherein said magnetic field is substantially parallel to said longitudinal axis along said longitudinal axis.

* * * * *